J. L. LA DRIERE.
TIRE PROTECTOR.
APPLICATION FILED JAN. 31, 1910.

964,977.

Patented July 19, 1910.

Witnesses
Phil E. Barnes
J. J. Sheehy Jr.

Inventor
J. L. La Driere
by James J. Sheehy
Attorney

UNITED STATES PATENT OFFICE.

JOSEPH L. LA DRIERE, OF ALBUQUERQUE, TERRITORY OF NEW MEXICO.

TIRE-PROTECTOR.

964,977.  Specification of Letters Patent. Patented July 19, 1910.

Application filed January 31, 1910. Serial No. 541,135.

*To all whom it may concern:*

Be it known that I, JOSEPH L. LA DRIERE, a citizen of the United States, residing at Albuquerque, in the county of Bernalillo and Territory of New Mexico, have invented new and useful Improvements in Tire-Protectors, of which the following is a specification.

My invention has to do with protectors for use on the pneumatic tires of vehicle wheels; and it has for its object to provide a simple, durable and easily applied tire protector, and one that is efficient in preventing wear and puncture of a tire, and is calculated to freely accommodate itself to the movements of the tire and to retain its flexibility and resiliency throughout the period of its use.

Figure 1:
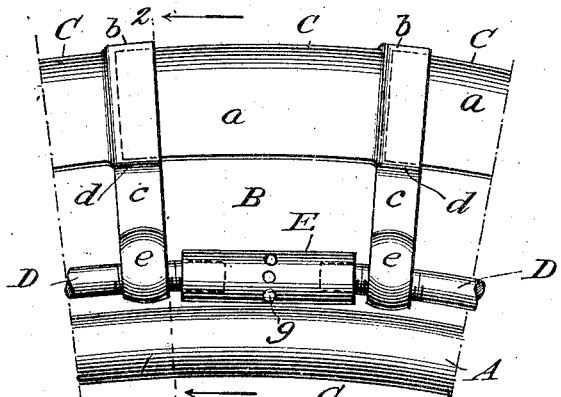
Figure 2:
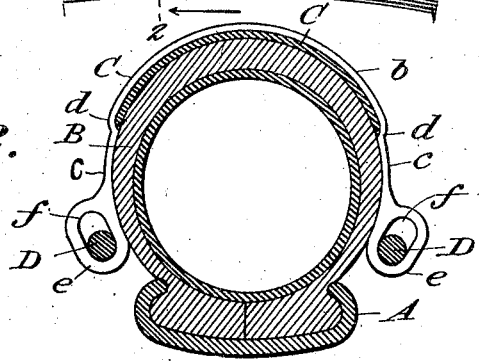

With the foregoing in mind the invention will be fully understood from the following description and claim when the same are read in connection with the drawings, accompanying and forming part of this specification, in which:

Figure 1 is a side elevation of so much of the protector constructed in accordance with my invention for use on the traction wheels of vehicles as is necessary to illustrate the full construction of the protector; the protector being shown as properly positioned on a wheel. Fig. 2 is a transverse section taken in the plane indicated by the line 2—2 of Fig. 1.

Referring by letter to the said drawings, A is a wheel rim. B is a pneumatic tire mounted on and carried by said rim, and C C are the protector sections which are preferably made of thin steel, though they may be made of other thin material suitable to their purpose without involving departure from the scope of my invention as claimed. The sections C are arranged end to end throughout the length of the protector, and inasmuch as they are identical in construction, a detailed description of the one shown in the middle of Fig. 1 and in Fig. 2 will suffice to impart a definite understanding of all. By reference to Figs. 1 and 2 it will be seen that the particularly mentioned section C comprises a major portion $a$ of concavo-convex form in cross-section, a flange $b$ at one end of the major portion $a$ and curved in a line parallel to the curvature of said portion $a$ and set out from the same so as to receive one end of the major portion $a$ of an adjoining section in such manner that the major portion of the adjoining section is adapted to rest in alinement with the major portion of the first-named section, arms $c$ that extend inwardly at $d$ from the ends of the flange $b$ and are then curved in conformity to the major portion $a$ so as to closely hug the tire, after the manner shown in Fig. 2, and lugs $e$ carried at the ends of the arms $c$ remote from the flange $b$ and having oblong or elongated apertures $f$, generally disposed in the same direction as the transverse curvature of the protector.

The several sections C of the protector are relatively arranged in the manner illustrated—that is to say, the flange $b$ of one section receives one end of an adjoining section, while the opposite end of the first-named section is disposed under the flange $b$ of another adjoining section. In this manner the joints between the sections are broken in such manner that the tire is protected as adequately at the joints as at other points throughout the protector, and also in such manner that the sections are permitted to move independently of each other to a limited extent so as to accommodate themselves better to the movements of the resilient pneumatic tire. It will also be here noted that the flanges $b$ extending outward beyond the plane of the outer sides of the major portions $a$ afford efficient means for engaging the ground and in that way contribute to the traction capacity of the wheel bearing the protector.

In addition to the sections C relatively arranged as described, my novel tire protector comprises circular rods D, preferably of steel, loosely arranged in the oblong apertures $f$ of the section lugs $e$, and means for drawing the ends of the ring-like rods D toward each other or moving said ends in opposite directions, as occasion demands. The said means may be of any construction compatible with the purpose of my invention without involving departure from the claimed scope thereof. I prefer, however, for the sake of simplicity, to employ in combination with each ring-like rod, a turnbuckle E; the ends of the rod in such case being provided with opposite threads, and the turn-buckle being provided with oppositely threaded sockets receiving the ends of the rod, and being also provided with radially disposed sockets g or other suitable means for the application of a turning implement.

It will be noted from the foregoing that the protector shown may be quickly and easily positioned and tightened on a tire, and that when properly positioned the protector is calculated to effectually prevent wear and puncture of the tire, and this while lending itself to a material extent to the flexibility and resiliency of the tire. This latter is due in part to the resiliency of the thin steel sections, and in part to the elongation of the apertures f in the lugs e, whereby the sections C are free to move outward and inward with respect to the ring-like rods D.

When the protector is properly fastened on a tire, there will be no liability of its being casually displaced, but notwithstanding this it will be readily understood that the protector may be expeditiously and easily removed from the tire after the turnbuckles E are turned to move the ends of the respective ring-like rods D in opposite directions.

The constructions herein illustrated and described constitute the best practical embodiment of my invention that I have as yet devised, but it is obvious that in the future practice of the invention such changes or modifications may be made as do not involve departure from the scope of my invention as defined in the claim appended.

Having described my invention, what I claim and desire to secure by Letters-Patent, is:

In a tire protector, the combination with parallel rings; of sections of concavo-convex form in cross-section, each section being formed in one piece and having a square end and also having at its opposite end an outwardly extending flange curved in conformity to the major portion of the section and provided with an outer square edge and receiving the opposite square end of an adjoining section and also having inwardly bent portions at the ends of said flange and curved arms depending from said bent portions and arranged in transverse alinement with the flange and provided with outwardly extending lugs in which are apertures oblong or elongated in the same general direction as the transverse curvature of the section and which apertures loosely receive the said rings.

In testimony whereof I have hereunto set my hand in presence of two subscribing witnesses.

JOSEPH L. LA DRIERE.

Witnesses:
 FRANCES DIVINE,
 L. MAY DONALDSON.